United States Patent
Davidson et al.

[11] Patent Number: 5,876,060
[45] Date of Patent: Mar. 2, 1999

[54] SEAT MOUNTED SIDE IMPACT MODULE

[75] Inventors: Phillip K. Davidson, Howell; Jonathan P. Hurford, Lake Orion, both of Mich.

[73] Assignee: Takata, Inc., Auburn Hills, Mich.

[21] Appl. No.: 760,754

[22] Filed: Dec. 5, 1996

[51] Int. Cl.[6] .................................................. B60R 21/22
[52] U.S. Cl. .................................. 280/730.2; 280/728.2; 280/728.3
[58] Field of Search .............................. 280/730.2, 728.2, 280/730.1, 728.1, 728.3

[56] References Cited

U.S. PATENT DOCUMENTS

| | | | |
|---|---|---|---|
| 4,964,654 | 10/1990 | Bishop et al. | 280/728.2 |
| 5,251,931 | 10/1993 | Semchena et al. | |
| 5,312,130 | 5/1994 | Baba . | |
| 5,498,030 | 3/1996 | Hill et al. | 280/730.2 |
| 5,499,840 | 3/1996 | Nakano | 280/730.2 |
| 5,531,470 | 7/1996 | Townsend | 280/730.2 |
| 5,547,214 | 8/1996 | Zimmerman, II et al. | 280/730.2 |
| 5,553,887 | 9/1996 | Karlow et al. | 280/728.3 |
| 5,556,127 | 9/1996 | Hurford et al. | 280/728.2 |
| 5,556,129 | 9/1996 | Coman et al. | 280/730.2 |
| 5,588,671 | 12/1996 | Boumarafi et al. | 280/728.3 |
| 5,613,701 | 3/1997 | Bentley et al. | 280/728.2 |
| 5,613,704 | 3/1997 | White, Jr. et al. | 280/728.2 |
| 5,645,295 | 7/1997 | White, Jr. et al. | 280/730.2 |
| 5,647,609 | 7/1997 | Spencer et al. | 280/730.2 |
| 5,651,582 | 7/1997 | Nakano | 280/730.2 |
| 5,667,242 | 9/1997 | Slack et al. | 280/730.2 |
| 5,690,354 | 11/1997 | Logan et al. | 280/728.2 |

FOREIGN PATENT DOCUMENTS

| | | |
|---|---|---|
| 450052 | 2/1992 | Japan . |
| 2232936 | 1/1991 | United Kingdom . |

*Primary Examiner*—Eric D. Culbreth
*Attorney, Agent, or Firm*—Harness, Dickey & Pierce, P.L.C.

[57] ABSTRACT

A side impact air bag module assembly for restraining a side impact air bag to a vehicle seat frame which provides a visible cover on the outside of the seat and allows the seat cavity to be only as large as the module's reaction housing. The housing encloses an inflator with a retainer configured to fasten the air bag, inflator, and housing to the seat back frame.

12 Claims, 4 Drawing Sheets

SEAT MOUNTED SIDE IMPACT MODULE

BACKGROUND OF THE INVENTION

1. Field of the Invention

This invention relates generally to inflatable motor vehicle occupant restraint systems, and more particularly, to an improved seat mounted module assembly for a vehicle supplemental inflatable restraint system which provides side impact protection.

2. Background Information

A significant percentage of occupant injuries are caused by side impact collisions. Conventional air bag modules have been utilized in frontal collisions in order to minimize occupant injuries. A typical air bag module has a housing, an inflator affixed to the housing, and an air cushion or air bag that is part of a restraint module. A crash sensor is used to sense a vehicle collision which triggers the inflator to release inflation gases and inflate the air bag. Vehicle air bags have been shown to provide a significant overall decrease in occupant injuries during frontal impacts. In view of this, recent attempts have been made to incorporate side impact air bags into vehicles in order to produce a similar reduction in occupant injury resulting from side impacts.

One type of side impact module assembly is mounted within a vehicle door in combination with a side impact sensor. The air bag is retained behind a deployment panel that opens to release the air bag during deployment. However, one problem with this type of side impact module results from the fact that different size occupants are present in the vehicle and the seats can be adjusted to various positions within the vehicle. For example, a large occupant will move a seat on the adjustable seat track to a rearmost position whereas a small occupant will move the seat to a fully forward position. Therefore, a larger air bag must be deployed from the vehicle door in order to cover the entire range of occupant seating positions and occupant sizes.

A second type of side impact air bag module is mounted to the vehicle's B-pillar or lock pillar. However, this implementation still suffers from the same problems inherent with mounting the module to a vehicle door; namely, the larger air bag must be utilized in order to cover the entire range of position of variously sized occupants.

A third type of side impact air bag module is mounted to a vehicle seat. By mounting the air bag module to a seat, which moves with the occupant, the air bag, can be deployed to a same position relative to the occupant regardless of the size and seating position of the occupant. Typically, a side impact module similar to those used for a front collision passenger air bag module are incorporated within a vehicle seat. The air bag, must emerge from the seat by tearing the seat trim, which is then damaged and probably irrepairable.

In addition to the foregoing, there is a continuing need to provide ease of assembly of the module as well as convenient mounting to the vehicle. The above-mentioned modules are mounted inside various vehicle components and upon deployment, the air bag, breaks through covering trim material or panels. In order to improve case of assembly, the side impact module of the subject invention is configured to be mounted externally on the outer surface of a vehicle seat. Since the module is external, it is in plain view. One reason for wanting a visible side impact module is so the occupant knows it is there and does not obstruct it. Further, assembly and replacement is made easier with an externally mounted design since it is not buried in the seat, thus allowing servicing the module without tearing, the seat apart. A visible module is also a good advertising point for the vehicle manufacturer, since it reminds the consumer of the presence of this feature on the automobile.

In order to address the design issues presented above, it is an object of the present invention to provide an improved side impact air bag module for a vehicle supplemental inflatable restraint system which is externally mounted to a vehicle seat.

SUMMARY OF THE INVENTION

In accordance with this invention, several embodiments of side impact air bag module assemblies are described. In each case, the module assembly is adapted to fit into a recessed cavity in the side of a motor vehicle's seat back. After installation, the assembly module conforms to the automobile's outside seat surface for aesthetic purposes. In the case of both embodiments, the module assemblies include a housing with a deep well portion and a housing cover. In one embodiment, the housing cover is larger than the deep well portion of the module assembly so as to extend to and enclose the edge of the seat cavity in which the module assembly fits. In another embodiment, the deep well portion of the housing forms a flange to cover the edges of the seat cavity, and the housing cover sits within the deep well portion to enclose the air bag in the housing.

In both embodiments, the module assembly includes an inflator having a threaded stud end which extends through a stud opening in a mounting plate on the top end of a retainer, and is secured to the retainer by a threaded nut. The retainer has two threaded mounting studs projecting from its rear face. The retainer, with attached inflator, is secured to the housing by extending the retainer's threaded mounting studs through mounting openings in the housing's rear face. The retainer's threaded mounting studs secure the entire module assembly to the seat frame of the vehicle. An air bag and an air bag cover which encompasses the air bag in the undeployed configuration are secured to the retainer. The air bag cover includes a tear seam, or tabs which tears when the air bag expands. The housing cover opens on inflation, allowing full deployment of the air bag.

The module assemblies of the present invention offer a simplified assembly with few separate parts. Furthermore, the current invention design facilitates maintenance and replacement of the air bag module assembly.

Further objects, features, and advantages of the invention will become apparent from a consideration of the following description and the appended claims when taken in connection with the accompanying drawings.

DETAILED DESCRIPTION OF THE PREFERRED EMBODIMENT

Figure 5:
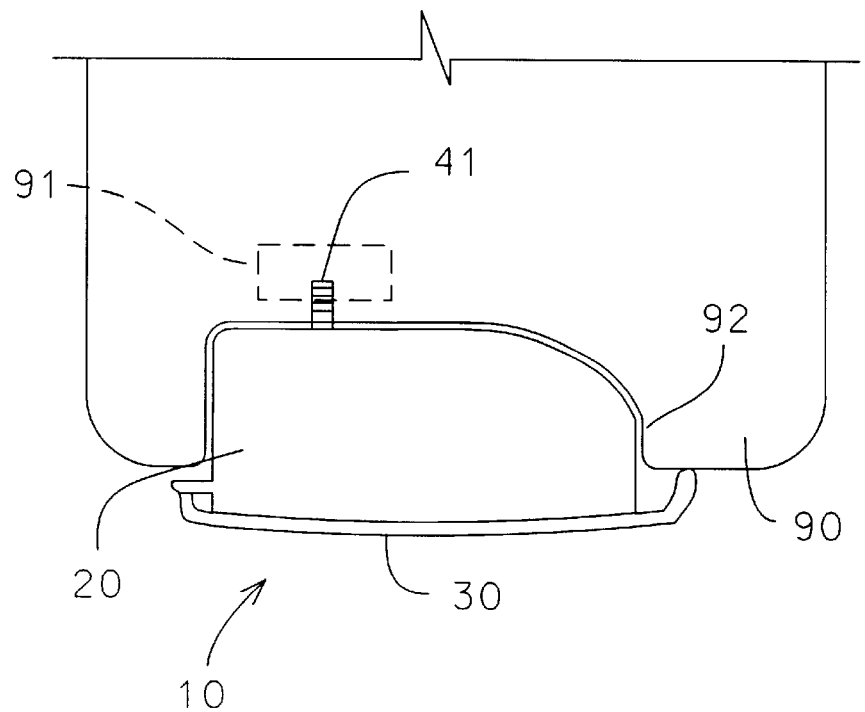
FIG. 5 is a cross-sectional view of a vehicle seat side showing the vehicle seat cavity, vertical frame member, and the first embodiment of the visible seat mounted side impact module assembly of the present invention in the finished assembled position.
Figure 6:
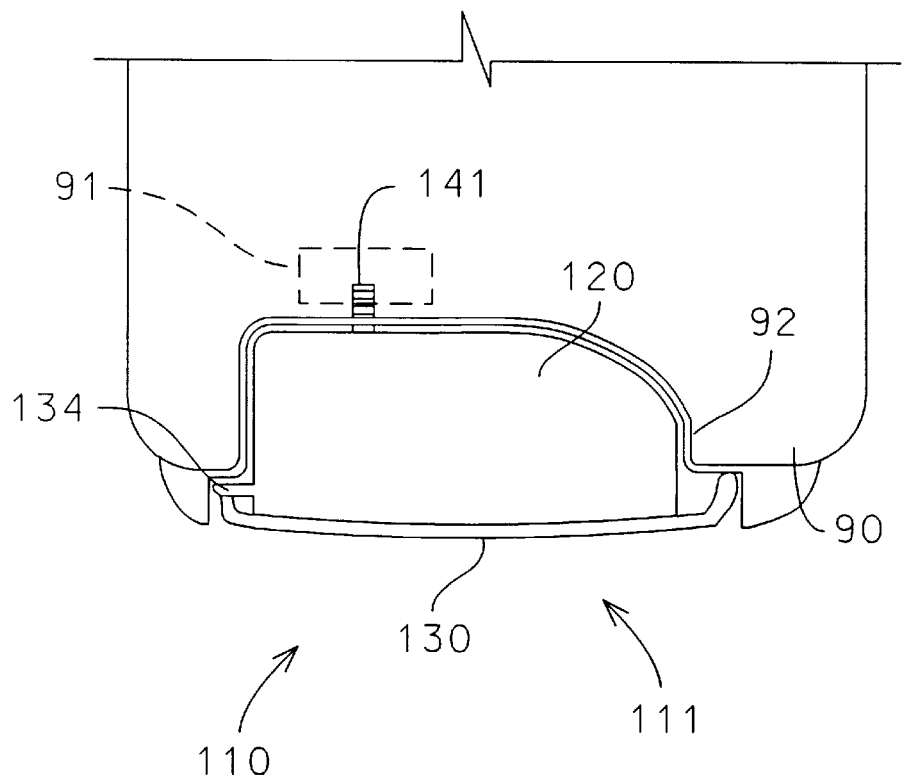
FIG. 6 is a cross-sectional view of a vehicle seat side showing the vehicle seat cavity, vertical frame member, and an alternative embodiment of a visible seat mounted side impact module assembly of the present invention in the finished assembled position.

In accordance with a preferred embodiment of this invention, a seat mounted side impact air bag module assembly 10 is formed from a housing 11 with deep well portion 20 and housing cover 30 having an inner surface and an outer surface, an inflator 70, a retainer 40, an air bag 50, and an air bag cover 60. The housing cover retainer 40, air bag 50, and air bag cover 60. As shown in FIG. 5, the completely assembled module assembly 10 is secured to a vehicle seat back 90 along a vertically extending seat frame member 91.

The housing 11 is preferably formed from a plastic composite with a deployment opening which faces outboard. Alternatively, the housing 11 is formed by either a magnesium casting or a deep-drawn sheet metal stamping. The housing 11 is constructed and arranged to receive the retainer 40, the inflator 70, the air bag 50, and the air bag cover 60 in a folded pre-inflation configuration as an air bag subassembly.

Figure 1:
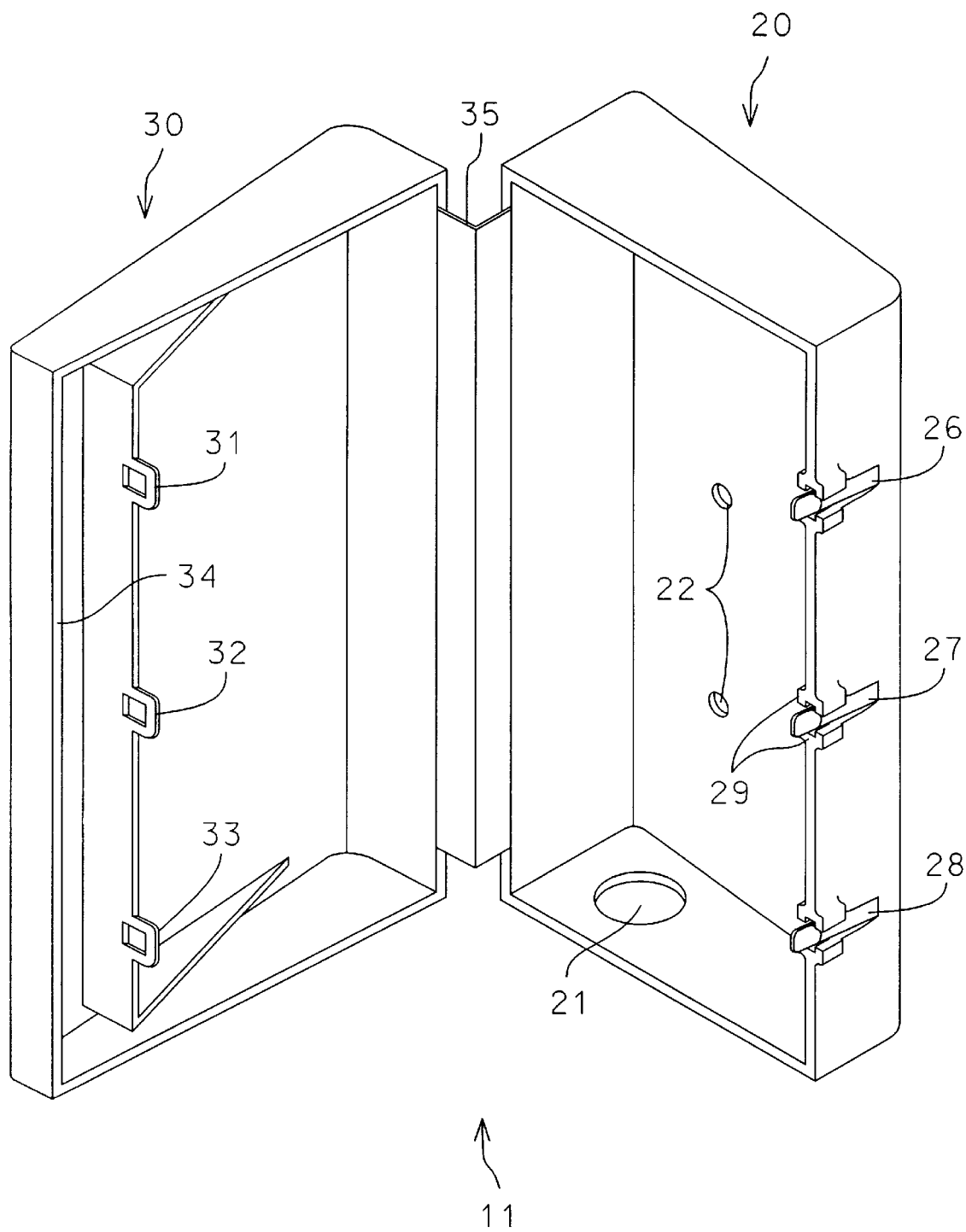
FIG. 1 is a pictorial view of a first embodiment of the housing ready to be fit with the air bag subassembly.
Figure 2:
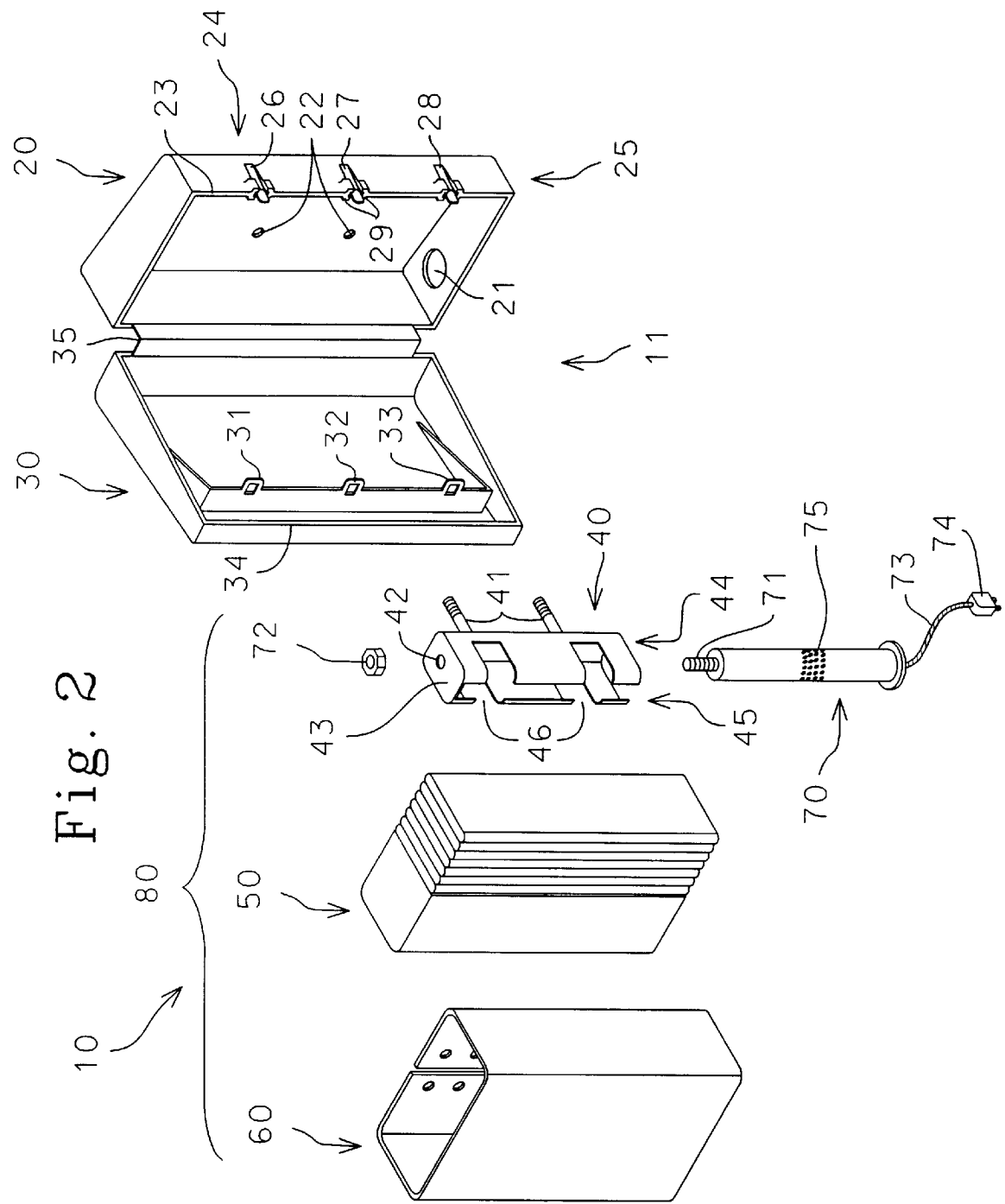
FIG. 2 is an exploded view of the first embodiment of the seat mounted side impact module assembly of this invention.

The retainer 40, shown in FIG. 2, is preferably constructed from sheet metal and has two fasteners shown as threaded mounting studs 41 extending from its rear face, mounting plate 43 on its top face including an inflator stud opening 42, and an open bottom face 44. The inflator 70 can be a pyrotechnic propellant, a compressed gas propellant, or a combination of both which is referred to as a "hybrid" inflator. The inflator 70 is inserted through the retainer open bottom face 44 until the inflator's threaded stud end 71 is received within the mounting plate 43 inflator stud opening 42. Thereafter, a nut 72 is threaded onto the inflator threaded stud end 71, trapping the inflator 70 within the retainer 40. The retainer 40 is made such that the inflator 70 is restrained within, but with enough openings 46 for the inflation gas to pass through. In the preferred embodiment of the present invention, the retainer 40 also includes a heat shield 45. The heat shield 45 is integrally formed with the retainer 40 and is located adjacent to the inflator 70 when the inflator 70 is assembled into the retainer 40. The heat shield 45 is also configured to direct the generated gases in a desired direction to assist in controlling the direction of inflation of the air bag 50.

The air bag 50 is made to encase the retainer 40 and inflator 70. The air bag 50 is preferably constructed of silicone coated nylon with two vents (not shown). The air bag cover 60, preferably made from TYVEK, available from DUPONT, encases the folded air bag 50, protects it from contaminants before inflation, and is designed to tear during inflation to allow the air bag 50 to pass through it. The air bag cover 60, air bag 50, retainer 40, and inflator 70, when assembled, form an air bag sub-assembly 80 which fits into the housing 11. This is but one of the myriad of forms the sub-assembly 80 can take.

This sub-assembly 80 is inserted into the housing 11. The inflator leadwire 73 and electrical connector 74 are configured to pass through opening 21 on the bottom face 25 of the deep well portion 20 of the housing 11. The retainer's threaded mounting studs 41 extend through the mounting openings 22 on the rear face 24 of the deep well portion 20 thereby trapping the housing 11 and the air bag 50 between the retainer 40, to which the threaded mounting studs 41 are attached, and the seat back 90.

The housing cover 30 is attached to the deep well portion 20 by a hinge 35 and is snap-fit into the deep well portion 20 to trap the sub-assembly 80 in the deep well portion 20 of the housing 11. The deep well portion 20 has three tabs 26–28 which correspond to three similarly spaced clips 31–33 on the housing cover 30. Each tab 26–28 has a front bevel face with an overhanging lip. The clips 31–33 each fit into restraining canals 29 adjacent to each tab 26–28. A hole in each clip 31–33 must be snapped over the corresponding overhanging lip so as to forcibly engage the housing cover 30 to the deep well portion 20.

Figure 3:
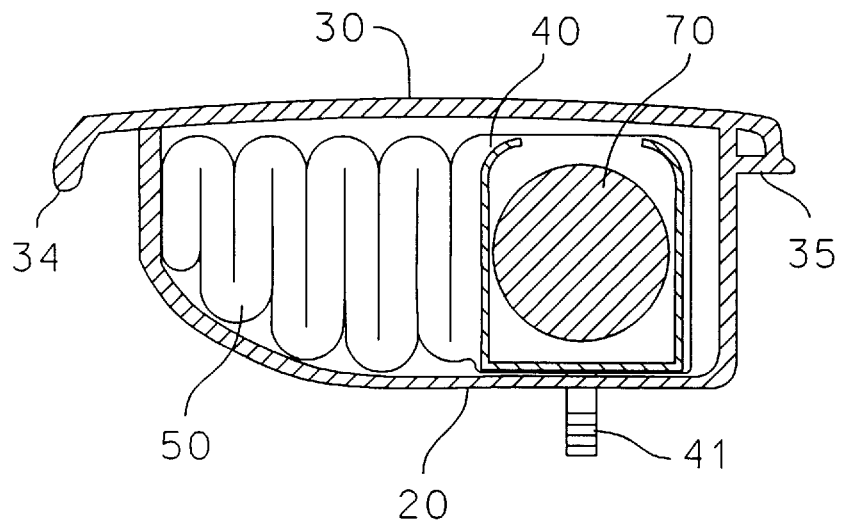
FIG. 3 is a cross-sectional view of the first embodiment of the seat mounted side impact module assembly of this invention ready for assembly into a vehicle seat cavity.
Figure 4:
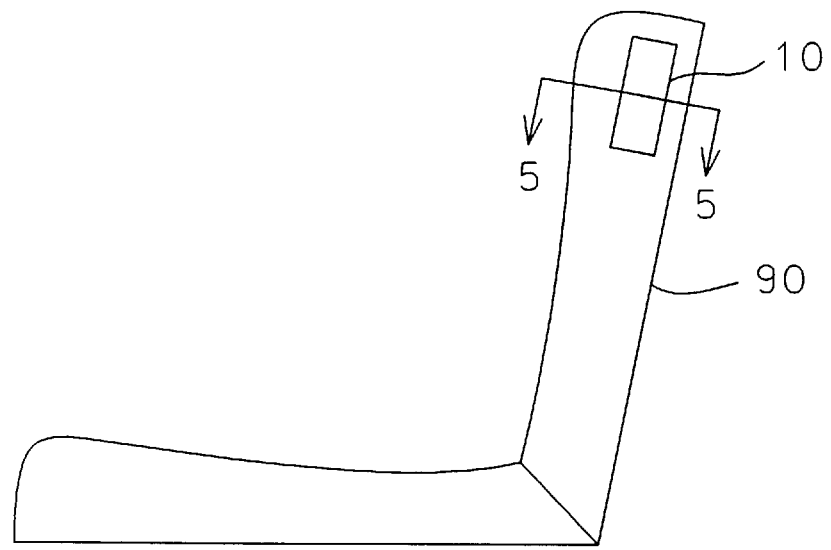
FIG. 4 is a side view showing the side impact module assembly of the present invention as installed in a vehicle seat.

The assembled module assembly 10 is shown in FIG. 3. The housing cover 30 is designed to be larger than the deep well portion 20 so that the cover 30 extends a lip 34 over the whole perimeter 23 (as shown in FIG. 2) of the deep well portion 20. This lip 34 is designed such that when the module assembly 10 is placed in the seat cavity 92, the lip 34 covers a portion of the seat material adjacent. This is done to conceal the edges of the seat cavity 92 and any mounting bolts used to fix the module assembly 10 to the vehicle seat frame member 91.

In operation, after receiving a crash signal, the inflator 70 generates gas which is directed into the air bag 50 by the nozzle 75, inflating the air bag 50. As the air bag 50 expands, the air bag cover tear seams open. The housing cover 30 is configured to open allowing the air bag 50 to inflate outside of the deep well portion 20 of the housing 11. The deep well portion 20 provides reaction surfaces to direct the inflation of the air bag 50. The inflated air bag provides energy absorption and an improved contact surface for an occupant during a vehicle crash.

FIG. 5 depicts a first alternative design of a visible side impact air bag module assembly 110. In this case, the deep well portion 120 of the housing 111 has an extended flange 134 that provides visible coverage of the edges of the seat cavity 92. The extended flange 134 extends to cover the seat material adjacent to the seat cavity 92. The housing cover 130 fits within the deep well portion 120.

It is to be understood that the invention is not limited to the exact construction illustrated and described above, but that various changes and modifications may be made without departing from the spirit and scope of the invention as defined in the following claims.

I claim:

1. A side impact air bag module assembly for mounting to a vehicle seat, the seat having a generally vertically extending seat back defining a recessed cavity, the module assembly comprising:

a housing having a well portion and a housing cover hinged about and carried by said well portion to enclose said well portion, said well portion having a mounting opening therein, said cover being moveable about at least one hinge between an opened and a closed position, wherein said housing is configured to mate with the recessed cavity such that said module assembly completely encloses and hides the recessed cavity;

an inflator for generating gas;

a retainer for receiving said inflator;

an air bag for receiving said generated gas;

a mounting fastener for securing said module assembly to said seat back in a position such that substantially all of an outer surface of said cover is in plain view, said mounting fastener extending from a rear face of said retainer thereby passing through said mounting opening in said well portion such that said housing and said air bag are trapped between said retainer and said seat back; and wherein said cover encloses said well portion when said cover is in said closed position and during inflation of said air bag said cover rotates about said hinge to said opened position allowing said air bag to inflate.

2. The module assembly of claim 1 wherein said cover includes an overhanging lip configured to extend outward from and around a perimeter of said well portion such that said lip engages the seat back thereby enclosing the recessed cavity.

3. The module assembly of claim 1 wherein said fastener further comprises a threaded mounting stud.

4. The module assembly of claim 1 wherein said retainer further comprises an integrally formed heat shield for directing said generated gas into said air bag in a desired direction and for shielding said air bag from said generated gas.

5. The module assembly of claim 4 wherein said inflator is cylindrical in shape and includes a threaded stud end and a nozzle portion, and wherein said retainer includes a mounting plate having an inflator stud opening for receiving, said inflator stud end such that said inflator is mounted to said retainer by inserting said inflator stud end through said inflator stud opening and engaging said inflator stud end with a threaded nut securing said inflator in place on said retainer.

6. The module assembly of claim 1 further comprising at least one clip carried by said cover, said clip configured to engage at least one tab carried by said well portion, such that said clip and said tab releasably secure said cover to said well portion in said closed position.

7. A side impact air bag module assembly for mounting to a vehicle seat, the seat having a generally vertically extending seat back defining a recessed cavity, the module assembly comprising:

a housing having a well portion with side walls and a housing cover hinged about and carried by said well portion to enclose said well portion, said well portion having a mounting opening therein, said cover being movable about at least one hinge between an opened and a closed position, wherein said cover includes an overhanging lip configured to extend outward past said side walls such that said lip engages the seat back thereby completely enclosing the recessed cavity;

an inflator for generating gas;

a retainer configured for receiving said inflator;

an air bag for receiving said generated gas; and a mounting fastener for securing said module assembly to said vehicle seat back in a position such that substantially all of an outer surface of said cover is in plain view, said mounting fastener extending from a rear face of said retainer thereby passing through said mounting opening in said well portion such that said housing and said air bag are trapped between said retainer and said seat back.

8. The module assembly of claim 7 wherein said hinge is on said overhanging lip and connects said cover to said well portion such that said cover encloses said well portion when said cover is in said closed position and during inflation of said air bag said cover rotates about said hinge to said open position allowing said air bag to inflate outside of the module assembly.

9. The module assembly of claim 7 wherein said fastener further comprises a threaded mounting stud.

10. The module assembly of claim 7 wherein said retainer further comprises an integrally formed heat shield for directing said generated gas into said air bag in a desired direction and for shielding said air bag from said generated gas.

11. The module assembly of claim 10 wherein said inflator is cylindrical in shape and includes a threaded stud end and a nozzle portion, and wherein said retainer includes a mounting plate having an inflator stud opening for receiving, said inflator stud end such that said inflator is mounted to said retainer by inserting said inflator stud end through said inflator stud opening and engaging said inflator stud end with a threaded nut securing said inflator in place on said retainer.

12. The module assembly of claim 7 further comprising at least one clip carried by said cover, said clip configured to engage at least one tab carried by said well portion, such that said clip and said tab releasably secure said cover to said well portion.

* * * * *

UNITED STATES PATENT AND TRADEMARK OFFICE
CERTIFICATE OF CORRECTION

PATENT NO.  : 5,876,060
DATED       : March 2, 1999
INVENTOR(S) : Phillip K. Davidson et al.

It is certified that error appears in the above-identified patent and that said Letters Patent is hereby corrected as shown below:

Column 1,
Line 59, "case" should be --ease--.

Column 2,
Line 38, after "seam," delete --or tabs--.

Column 3,
Line 15, after "housing cover" insert --30 is hinged and snap-fit to the deep well portion 20 of the housing 11 to encase the inflator 70,--.
Line 42, begin new paragraph with "In the preferred embodiment...."
Line 52, after "shown)" insert --located near the top--.
Line 62, "inflator leadwire" should be --electrical cord--.

Signed and Sealed this

Third Day of July, 2001

Attest:

NICHOLAS P. GODICI
Attesting Officer
Acting Director of the United States Patent and Trademark Office